(12) United States Patent
Soecknick et al.

(10) Patent No.: US 8,668,830 B2
(45) Date of Patent: Mar. 11, 2014

(54) INTERRUPTION OF MEASURED VARIABLE ANALYSES IN AN AUTOMATIC WATER SOFTENING SYSTEM WHEN DEFINED OPERATING SITUATIONS ARE PRESENT

(75) Inventors: Ralf Soecknick, Kornwestheim (DE); Klaus Neidhardt, Grosserlach (DE); Alexander Haug, Remseck (DE); Siegfried Melcher, Oberstenfeld (DE)

(73) Assignee: Judo Wasseraufbereitung GmbH, Winnenden (DE)

( * ) Notice: Subject to any disclaimer, the term of this patent is extended or adjusted under 35 U.S.C. 154(b) by 292 days.

(21) Appl. No.: 13/058,503

(22) PCT Filed: Aug. 13, 2009

(86) PCT No.: PCT/DE2009/001154
§ 371 (c)(1),
(2), (4) Date: Feb. 10, 2011

(87) PCT Pub. No.: WO2010/025697
PCT Pub. Date: Mar. 11, 2010

(65) Prior Publication Data
US 2011/0139720 A1      Jun. 16, 2011

(30) Foreign Application Priority Data

Sep. 2, 2008   (DE) .......................... 10 2008 045 354

(51) Int. Cl.
*C02F 1/42*   (2006.01)
(52) U.S. Cl.
USPC ............ 210/662; 210/670; 210/687; 210/746
(58) Field of Classification Search
USPC ........ 210/96.1, 100, 101, 662, 739, 746, 670, 210/687; 137/5; 700/239, 271, 285
See application file for complete search history.

(56) References Cited

U.S. PATENT DOCUMENTS

| | | | | |
|---|---|---|---|---|
| 4,943,371 | A | * | 7/1990 | Tsviatko et al. ............... 210/101 |
| 6,814,872 | B2 | * | 11/2004 | Rawson ......................... 210/662 |
| 6,939,470 | B2 | * | 9/2005 | Baarman et al. ............... 210/739 |

(Continued)

FOREIGN PATENT DOCUMENTS

| | | |
|---|---|---|
| CN | 2041435 U | 7/1989 |
| CN | 20081836 U | 7/1991 |

(Continued)

*Primary Examiner* — Matthew O Savage
(74) *Attorney, Agent, or Firm* — Hackler Daghighian & Martino

(57) ABSTRACT

A method for operating a water softening system (1) comprising
an automatically adjustable blending means for mixing a blended water flow $V(t)_{blended}$ from a first, softened partial flow $V(t)_{part1soft}$ and a second untreated water partial flow $V(t)_{part2raw}$ and comprising
an electronic control means (11),
wherein the control means (11) readjusts the adjustment position of the blending means by means of one or more experimentally determined instantaneous measured values in such a fashion that the water hardness in the blended water flow $V(t)_{blended}$ is adjusted to a predetermined desired value (SW), is characterized in that
the control means (11) ignores at least one of the one or more instantaneous measured values for readjustment of the adjustment position of the blending means in one or more defined operating situations, and instead uses the respectively last corresponding measured value that was valid prior to occurrence of the defined operating situation, or a standard value for the corresponding measured value, which is stored in the electronic control means (11). The inventive method reduces the wear of the automatically adjustable blending means and improves the reliability of the adjustment of the water hardness of the blended water.

21 Claims, 2 Drawing Sheets

(56) References Cited

U.S. PATENT DOCUMENTS

2006/0231500 A1* 10/2006 Speece et al. .............. 210/739
2006/0243647 A1* 11/2006 Mitsis ........................ 210/96.1
2007/0215531 A1   9/2007 Wawrla et al.

FOREIGN PATENT DOCUMENTS

| | | |
|---|---|---|
| DE | 19841568 A1 | 5/1999 |
| EP | 0900765 A2 | 3/1999 |
| JP | S63130599 A | 6/1988 |
| JP | H01151897 A | 6/1989 |
| JP | H02-069445 | 3/1990 |
| JP | H03202190 A | 9/1991 |
| JP | H07501746 A | 2/1995 |
| JP | H10-043611 | 2/1998 |
| JP | 2000061462 A | 2/2000 |
| JP | 2002045852 A | 2/2002 |
| JP | 2003019480 A | 1/2003 |
| JP | 2008518232 A | 5/2008 |
| JP | 2010513003 A | 4/2010 |
| JP | 2011505243 A | 2/2011 |
| RU | 26846 U1 | 12/2002 |
| WO | WO 2009/071066 A2 | 6/2009 |

* cited by examiner

INTERRUPTION OF MEASURED VARIABLE ANALYSES IN AN AUTOMATIC WATER SOFTENING SYSTEM WHEN DEFINED OPERATING SITUATIONS ARE PRESENT

The invention relates to methods for operating a water softening system with
- an automatically adjustable blending means for mixing a blended water flow $V(T)_{blended}$ from a first softened partial flow $V(t)_{part1soft}$ and a second untreated water partial flow $V(t)_{part2raw}$, and with
- an electronic control means, wherein the control means readjusts the adjustment position of the blending means by means of one or more experimentally determined instantaneous measured values in such a fashion that the water hardness in the blended water flow $V(t)_{blended}$ is adjusted to a predetermined desired value.

EP 0 900 765 B1 discloses a water softening system that is operated in accordance with a method of this type.

Water is softened anywhere where the usual supply systems (e.g. the drinking water network) only provide relatively hard water but softer water is desired for technical or comfort reasons.

Water is softened using softening devices, most of which work according to the ion exchange method. The hardness components (calcium and magnesium ions) that are contained in the water are thereby exchanged with sodium ions in an ion exchange resin. When the ion exchange resin is depleted it must be regenerated e.g. by rinsing it with brine.

When a simple softening device is serially connected upstream of a water installation, the downstream water installation is provided with fully softened water. However, for technical or economical reasons, it is often necessary or desired not to use fully softened water but water of an average, however, tightly defined water hardness. Water of an excessively low water hardness can cause problems with corrosion in line installations due to poor or non-existent formation of a protective layer, is less valuable for the health (in the form of drinking water) due to the lack of minerals, and also results in high maintenance costs for a water softening system due to frequent regenerations. On the other hand, an excessively high water hardness can damage fittings and technical devices due to calcification. There are additionally technical devices that are exclusively or at least preferably operated with a tightly defined water hardness. For example, for washing machines, the optimum washing agent amount greatly depends on the water hardness.

EP 0 900 765 B1 discloses a water softening system with fully automatic blending. An untreated water flow, which carries relatively hard water, is divided into a first partial flow that flows through an ion exchange resin, and a second partial flow in a bypass line. After softening of the first partial flow, the partial flows are reunited (so-called blending). The hardness of the incoming untreated water is determined by means of a conductivity sensor, and a ratio between the partial flows, which is determined by two flow meters, is readjusted by an automatically adjustable valve as a blending means in dependence on the untreated water hardness. This water softening system provides a blended water flow of constant water hardness even when the untreated water hardness varies.

The operation of this conventional water softening system, however, makes great demands on the wear resistance of the automatically adjustable blending means. In case of malfunction of components that are involved in blending control, it may also happen that the water hardness of the blended water greatly differs from the desired value.

OBJECT OF THE INVENTION

It is the underlying purpose of the present invention to provide a method for operating a water softening system which reduces the wear of the automatically adjustable blending means and which improves the reliability of adjustment of the blended water hardness where possible.

SUMMARY OF THE INVENTION

This object is achieved by an operating method of the above-mentioned type, which is characterized in that the control means ignores at least one of the one or more instantaneous measured values for the readjustment of the adjustment position of the blending means in one or more defined operating situations, and instead uses the respectively last corresponding measured value that was valid prior to occurrence of the defined operating situation, or a standard value for the corresponding measured value, which is stored in the electronic control means.

The inventive operating method permits differentiation according to whether the evaluation of an instantaneous measured value, which influences the automatic readjustment of the adjustment position of the blending means, shall be performed or not at that moment. When evaluation shall not be performed, the instantaneous measured value is replaced by either a last valid value of the associated measured value or a stored standard value (or substitute value). Within the scope of the present invention, it has turned out that replacement by a previous measured value or a stored standard value renders water blending more reliable or also reduces the wear of the blending means (including its automatic operating systems). An inventive stored standard value for a measured value may be pre-programmed in the control means or also be occasionally updated during the current operation of the water softening system (manually or also automatically).

The evaluation of the instantaneous (determined directly or indirectly by a sensor) measured value is omitted in certain defined operating situations in accordance with the invention. These operating situations are defined prior to start up of the water softening system and are typically stored (programmed) in the electronic control means. A stored operating situation thereby comprises both the criterion (or criteria) defining this operating situation, and also the determination of the measured value to be ignored and of the measured value to be taken as a substitute. Within the scope of the invention, defined operating situations may be determined and established as required in view of the equipment and functionalities of the operated water softening system.

One important case for which a defined operating situation can be established in accordance with the invention, consists in that an instantaneous measured value, as provided in the electronic control means, is not reliable. This may e.g. be the consequence of a defect of a measuring means (water hardness sensor, flow meter etc.). An unreliable value may e.g. be recognized in that it is outside of a pre-defined value range or the values greatly fluctuate with time. An unreliable value may also be detected by additional sensors which are connected to the electronic control unit and do not monitor the measured value itself. Blending control on the basis of an unreliable measured value generally results in that the blended water hardness may greatly differ from the desired value. By replacing the unreliable measured value in accordance with the invention, however, the deviation of the blended water hardness from the desired value can generally be minimized.

One further important case for which a defined operating situation can be established in accordance with the invention consists in that the value of an instantaneous measured value has only slightly changed since a last readjustment of the adjustment position such that the variation of the blended water hardness is also only small. In this situation, the present invention can prevent readjustment (mechanical adjustment) of the blending means.

For this purpose, a last valid value is typically used for the corresponding measured value (in the last readjustment) instead of the hardly changed instantaneous measured value. When the database has not changed, the electronic control means need not control adjustment of the blending means. This reduces the overall frequency of adjustments of the blending means, thereby reducing the mechanical wear.

If necessary, a deviation (which is generally negligible and temporary) of the blended water hardness from the desired value is accepted during the defined operating situations in accordance with the present invention.

The predetermined desired value of the blended water hardness may be one single target hardness value or also a target hardness value interval, wherein, when this interval is exceeded or fallen below, the adjustment position of the blending means is readjusted.

Typical instantaneous measured values which are evaluated (and, if necessary, ignored in accordance with the invention) by the control means for readjustment of the adjustment position, are e.g. the instantaneous untreated water hardness $WH_{raw}^{inst}$, the instantaneous blended water hardness $WH_{blended}^{inst}$, the instantaneous first partial flow $V(t)_{part1soft}^{inst}$, the instantaneous second partial flow $V(t)_{part2raw}^{inst}$ the instantaneous overall untreated water flow $V(t)_{rawall}^{inst}$, also briefly called $V(t)_{raw}^{inst}$, and the instantaneous blended water flow $V(t)_{blended}^{inst}$. Instantaneous measured values are typically experimentally determined with (and in) the water softening system.

Within the scope of the invention, the water hardness is generally indirectly determined by a sensor through conversion of a physical measured value (e.g. the conductivity) into a water hardness within the electronic control means. Conductivity sensors have proven to be suitable for determining the hardness of untreated water. An ion-sensitive electrode or a titrator are e.g. suited as sensor for determining the blended water hardness or the soft water hardness.

The blending means is controlled in a simplified way using a specific instantaneous water hardness of the untreated water $WH_{raw}^{inst}$. Information about the ratio between the two partial flows in the blended water is only obtained through the adjustment of the blending means (the ratio between the partial flows that results with different settings of the blending means must thereby be previously determined and stored in the electronic control means). The blending accuracy is sufficient for most applications when the pressure ratios at the inlet and outlet of the water softening system are constant. In an alternative fashion, the partial flows may also be constantly experimentally determined during operation, which yields a higher control accuracy.

When the blending means is controlled using an experimentally determined instantaneous water hardness of the blended water $WH_{blended}^{inst}$, fluctuations in the ratio of the partial flows in the blended water, which may result with identical setting of the blending means due to fluctuations of external conditions (e.g. the pressure of the incoming untreated water or the volume of the withdrawn blended water flow), may be compensated for, and the blended water hardness remains with particular precision at the desired value during normal operation. In this case, the adjustment position of the blending means is directly readjusted to the desired value using the instantaneous blended water hardness $WH_{blended}^{inst}$.

In summary, the present invention proposes readjustment of the adjustment position of the blending means on the basis of values for the at least one measured value, which are stored in the control means, for mixing a (non-vanishing) blended water flow in the defined operating situations. This prevents evaluation or use of an unreliable or only negligibly changed instantaneous measured value for readjustment of the adjustment position. Suspension of evaluation of an instantaneous measured value may be displayed by an optical and/or acoustic signal in accordance with the invention.

PREFERRED VARIANTS OF THE INVENTION

One variant of the inventive method is preferred, which is characterized in that the water softening system comprises a sensor in the untreated water area of the water softening system for determining the instantaneous untreated water hardness $WH_{raw}^{inst}$ and at least two flow meters for direct or indirect determination of the instantaneous partial flows $V(t)_{part1soft}^{inst}$ and $V(t)_{part2raw}^{inst}$,
and that in the defined operating situations, the control means ignores at least one of the instantaneous measured values $WH_{raw}^{inst}$, $V(t)_{part1soft}^{inst}$ and $V(t)_{part2raw}^{inst}$ for readjustment of the adjustment position of the blending device, and instead uses the respectively last corresponding measured value that was valid prior to occurrence of the defined operating situation, or a standard value for the corresponding measured value, which is stored in the electronic control means. This embodiment combines simple water hardness determination in the untreated water area with experimental (i.e. therefore more accurate) determination of the partial flows during operation. For indirect determination (through calculation of the difference) of one or more of the partial flows $V(t)_{part1soft}^{inst}$ and $V(t)_{part2raw}^{inst}$, a third partial flow $V(t)_{part3rinse}^{inst}$ which is used for regenerating the softening device, must also be considered, if necessary. In the defined operating situations, one or more of the instantaneous measured values is/are not reliable or the value(s) thereof has/have only minimally changed since a last readjustment of the adjustment position of the blending means.

In one particularly preferred further development of this variant, the sensor is designed as a conductivity sensor which determines the instantaneous electrical conductivity $L_{raw}^{inst}$ of the untreated water, the control means determines the instantaneous untreated water hardness $WH_{raw}^{inst}$ from the defined instantaneous conductivity $L_{raw}^{inst}$ of the untreated water,
wherein the control means furthermore determines an instantaneous desired ratio between the partial flows $V(t)_{part1soft}$ and $V(t)_{part2raw}$ from the defined instantaneous untreated water hardness $WH_{raw}^{inst}$, by means of which ratio the predetermined desired water hardness value is adjusted in the blended water flow $V(t)_{blended}$, and wherein the control means readjusts the adjustment position of the blending means to the instantaneous desired ratio by means of the defined instantaneous partial flows $V(t)_{part1soft}^{inst}$ and $V(t)_{part2raw}^{inst}$. This variant has proven itself in practice. The water hardness is generally calculated from the conductivity using a characteristic, or is read-out by means of an allocation table. The desired ratio of the partial flows is generally also calculated.

In another preferred further development of the above-mentioned method variant, the control means ignores the measured values for the two instantaneous partial flows $V(t)_{part1soft}^{inst}$ and $V(t)_{part2raw}^{inst}$ only in combination together. This ensures that the last valid (the last reliable) ratio between the partial flows or a standard ratio is taken as a basis, thereby avoiding major deviations of the blended water hardness from the desired value.

In another preferred further development, the defined operating situations comprise times when the ratio between the measured values $V(t)_{part1soft}^{inst}$ and $V(t)_{part2raw}^{inst}$ has changed by less than a relative flow change value since the last readjustment of the adjustment position of the blending means, in particular, wherein the relative flow change value is between 2% and 10%. This reduces the wear of the blending means due to less frequent readjustment. Typical ratios between the first and the second partial flow are in a range between 0.25 and 3. When the untreated water hardness is e.g. 12° dH (dH=Deutsche Härte (German hardness)) and a blended water hardness of 8° dH is to be obtained, the desired ratio between the soft water (first partial flow, with a hardness of 0° dH) and the untreated water (second partial flow, with a hardness of 12° dH) is 1:2=0.5. In the last readjustment, the actual instantaneous ratio between the first and the second partial flow was adjusted to the desired ratio 0.5. When the actual ratio changes (e.g. due to changed flow ratios with a changed overall flow), readjustment at a relative flow change value of e.g. 5% is performed only when the actual ratio has decreased to 0.475 or increased to 0.525 (5% of 0.5=0.025).

In another advantageous method variant, the water softening system comprises a sensor in the blended water area of the water softening system for determining the instantaneous blended water hardness $WH_{blended}^{inst}$, and the control means ignores at least the instantaneous measured value $WH_{blended}^{inst}$ for the readjustment of the adjustment position of the blending device in the defined operating situations, and instead uses the last valid determined blended water hardness prior to occurrence of the defined operating situation or a standard value for the blended water hardness, which is stored in the electronic control means. In this variant, the blended water can be adjusted with great precision without having to determine the first or the second partial flow. The blended water hardness can be directly compared with the desired value and the adjustment position can be appropriately readjusted.

In one advantageous method variant, the defined operating situations include the times of regeneration of a softening device. When the first or second partial flow is indirectly determined (through calculation of the difference, e.g. with the overall untreated water flow) and a rinsing flow $V(t)_{part3rinse}$ through the softening device, which is typically branched off from or upstream of the first partial flow, is not detected, the indirect determination of the partial flows becomes incorrect and therefore unreliable.

In one particularly preferred method variant, the defined operating situations include falling below a minimum flow rate and/or exceeding a maximum flow rate at a flow meter. In this case, the measured values that depend on this flow meter are typically ignored (in general $V(t)_{part1soft}^{inst}$ and $V(t)_{part2raw}^{inst}$). The flow rate is preferably only evaluated in an average working area of the flow meter, in particular, between 100 l/h and 2500 l/h, preferably between 150 l/h and 1800 l/h, in which the flow meter works in a reliable and precise fashion. Values outside of this range are regarded as being unreliable. The minimum flow rate typically corresponds to the starting value of the flow meter (or is also slightly higher). The maximum flow rate typically corresponds to the upper working area of the flow meter (or is also slightly lower) or also (with respect to the first partial flow) to the nominal volume flow of the softening device, above which softening is only incomplete.

In another preferred method variant, the defined operating situations include times during which a hardness breakthrough at the water softening system occurs. A hardness breakthrough exists when the softening device has been depleted (e.g. in case of lack of salt for regeneration) or when the nominal volume flow of the softening device is exceeded. In this case, the desired value of the blended water flow cannot be achieved and adjustment of the blending means may be omitted in order to reduce wear. An existing hardness breakthrough can additionally be displayed by an optical and/acoustic signal.

In one further preferred method variant, the defined operating situations include times when a leakage at the water softening system or any downstream water installation is determined. A leakage can be determined e.g. via humidity sensors and/or untypical flow conditions derived from the measured values of flow meters which are used for determining the instantaneous partial flows. Untypical flow conditions include e.g. very large absolute flows (large leakage, "pipe burst") or long lasting constant small flows (small leakage with otherwise closed fittings, "dripping water tap").

In one particularly preferred method variant, the control means completely suspends readjustment of the adjustment position of the blending means at least in some of the defined operating situations such that the blended water flow is mixed using the last adjustment position of the blending means, which was set prior to occurrence of the defined operating situation. In this case, all instantaneous measured values are effectively ignored. This reliably prevents exotic adjustment positions of the blending means and thereby helps to keep the blended water hardness close to the desired value even in case of disturbances. As an alternative to suspension of readjustment, it is also possible to set each measured value to a standard value and select a corresponding adjustment position of the blending means.

In one particularly preferred method variant, the defined operating situations include times when an experimentally determined instantaneous water hardness, in particular, an instantaneous untreated water hardness $WH_{raw}^{inst}$ or an instantaneous blended water hardness $WH_{blended}^{inst}$ is outside of a predetermined value interval, in particular, wherein the value interval ranges from 2° dH to 50° dH. This permits detection of malfunctions of the sensor delivering absurd (unreliable) hardness values, which are then ignored in the readjustment of the blending means. For determining the hardness of soft water, the value interval includes a range starting with 0° dH, i.e. for example 0° dH to 50° dH. The malfunction of a sensor or the suspension of evaluation of the associated instantaneous measured value for readjustment of the adjustment position of the blending means can be displayed by an optical and/or acoustic signal.

In another particularly preferred method variant, the defined operating situations include times when an experimentally determined instantaneous water hardness, in particular, an instantaneous untreated water hardness $WH_{raw}^{inst}$ or an instantaneous blended water hardness $WH_{blended}^{inst}$ has changed since the last readjustment of the adjustment position of the blending means by less than a pre-defined hardness difference value, in particular, wherein the hardness difference value is between 0.2° dH and 2.0° dH. This prevents wear of the blending means due to frequent readjustment. The hardness difference value may also be relative.

In one preferred method variant, the water softening system comprises a conductivity sensor in the untreated water area for determining the instantaneous conductivity of the untreated water $L_{raw}^{inst}$, and the defined operating situations include times when the instantaneous measured value $L_{raw}^{Inst}$ has changed by less than a predefined value since the last readjustment of the adjustment position of the blending means, in particular, wherein the conductivity difference value is between 5 μS/cm and 50 μS/cm. This also reduces the wear of the blending means. The conductivity difference value may also be relative.

In another advantageous method variant, the defined operating situations include times when at least a minimum amount of water has not been flowing continuously through the water softening system directly prior to an intended evaluation of one or more of the instantaneous measured values. This increases the measuring accuracy (and thereby the reliability of the measured values) at the sensor and at the flow meters, in particular, by preventing measurement of stagnant water and preventing reading-out of still starting moving parts. A typical minimum amount of water is in a range between 250 ml and 5 liters, in particular approximately 1 liter.

In another equally advantageous method variant, the defined operating situations include times when water has not been continuously flowing through the water softening system for at least a minimum duration directly prior to an intended evaluation of one or more of the instantaneous measured values. This similarly increases the measuring accuracy (and thereby the reliability of the measured values) at the sensor and at the flow meters. A typical value for the minimum duration is in a range between 5 seconds and one minute, in particular, approximately 10 seconds. The control means preferably only accesses the instantaneous measured values when both a defined water volume (minimum amount) has previously flown through the softening system and water has been continuously flowing through the softening system for a defined time period (minimum duration).

In another preferred method variant, the water softening system comprises an automatically actuatable stop valve directly downstream of an inlet of the water softening system, and the control means automatically closes the stop valve after detection of a leakage such that the water flow through the water softening system and any existing water installation connected to an outlet (3) of the water softening system is interrupted. This provides good protection against damage caused by water. A leakage is e.g. detected by a humidity sensor or through detection of untypical flow conditions via the flow meters (see above).

Method Variants Concerning Regeneration Control

Another preferred variant of the inventive operating method is characterized in that the water softening system further comprises a storage container for providing regenerant solution and also means for automatic performance of regeneration of a softening device, and that the control means automatically triggers regeneration of the softening device in dependence of the soft water withdrawals performed since the last regeneration of the softening device. In this variant, control of regeneration of the softening device is integrated in the control functions of the electronic control device. The basic capacity of the softening device is typically always assumed to be the same after each regeneration, which, when based on an untreated water hardness, corresponds to a defined generated soft water amount. In the simplest case, the basic untreated water hardness is pre-programmed (fix pro-grammed or can only be manually changed).

In one particularly preferred further development of this variant, the control means determines in dependence on the soft water withdrawals performed since a last triggered regeneration, and on one or more associated determined untreated water hardnesses, a residual capacity of the softening device, and upon depletion thereof, automatically triggers regeneration of the softening device. This further development renders regeneration control of the softening device more efficient.

The basic capacity of the softening device is typically assumed to be always the same after each regeneration, which, when based on an untreated water hardness, corresponds to a defined generated soft water amount. Within the scope of the present invention, the untreated water hardness that is to be taken as a basis for regeneration control is preferably directly or indirectly empirically determined via a sensor. In the simplest case, the untreated water hardness is newly determined once after termination of one regeneration (e.g. at the start of the first water withdrawal), and the amount of soft water that can be generated is correspondingly updated for the current operating cycle (=the time between two regenerations). The update of the soft water amount may also be omitted for reasons of simplicity when the change in the newly determined untreated water hardness stays below a change limiting value compared to the last basic untreated water hardness. Typical change limiting values below which an update of the water amount is omitted, are in a range between 0.5° dH and 2.0° dH.

In order to increase the accuracy of the determination of the residual capacity, the different soft water withdrawals within one operating cycle may be weighted with the associated instantaneous untreated water hardnesses. It is thereby possible to use one single untreated water hardness determined at the start of each soft water withdrawal for the entire remaining water withdrawal usually without any noticeable loss in accuracy in order to simplify the process. The capacity used up with each water withdrawal reduces the remaining capacity (residual capacity) of the softening device in the current operating cycle. In an alternative fashion, capacity depletion can also be continuously detected using more complex mathematical methods (e.g. convolution methods), which also take into consideration changes in the untreated water hardness during one single water withdrawal.

In the simplest case, the untreated water hardness is determined directly in the untreated water area by means of a sensor. The untreated water hardness may also be determined from the instantaneous blended water hardness in connection with the instantaneous partial flows (in particular, their instantaneous ratio).

The withdrawn soft water amount is determined either directly by means of a flow meter (in most cases in the soft water area) or indirectly through calculation of the difference.

As an alternative to the determination of the untreated water hardness and the soft water withdrawals performed since a last triggered regeneration for controlling regeneration of the softening device, the quality of the soft water can be controlled by means of a sensor for determining the hardness in the soft water area. As soon as the soft water hardness exceeds a limiting value, regeneration is triggered. Typical limiting values above which regeneration is triggered are in a range between 0.5° dH and 2.0° dH. The sensor may e.g. be designed as an ion-sensitive electrode or a titrator.

In one further development of the above-mentioned further development, the control means ignores at least one of the one or more instantaneous measured values also for automatic triggering of regeneration of the softening system in one or more defined operating situations, and instead uses the respective last corresponding measured value that was valid prior to occurrence of the operating condition or a standard value for the corresponding measured value, which is stored in the electronic control means. This improves the reliability of the automatic regeneration control and, in particular, reduces the likelihood of a hardness breakthrough due to depletion of the softening device. In most cases, a value for $WH_{raw}^{inst}$ or $WH_{blended}^{inst}$ that has been detected as being unreliable is thereby ignored for regeneration control. It should be noted that the inventive substitute values for instantaneous measured values may be different for blending control and regeneration control.

Another further development of the above-mentioned further development is characterized in that the water softening system has a conductivity sensor in the untreated water area, and an overall hardness I of the untreated water, which hardness is used to control the regeneration process of the softening device, is derived from the measured conductivity $L_{raw}$, by means of a first calibration characteristic (F1), and an overall hardness II of the untreated water, which hardness is used for controlling the blending means, is derived from the measured conductivity $L_{raw}$ by means of a second calibration characteristic (F2). The use of the two different calibration characteristics improves the accuracy of automatic blending and also the safety (punctuality) of automatic regeneration triggering.

The above-mentioned further development preferably provides that the overall hardness I derived from the first calibration characteristic (F1) is, at least in sections, larger than the overall hardness II derived from the second calibration characteristic (F2). The first calibration characteristic (F1) typically has a conversion factor of 28 to 35 μS/cm per °dH, in particular 30 to 33 μS/cm per °dH, and the second calibration characteristic (F2) typically has a conversion factor of 35 to 44 μS/cm per °dH, in particular 38 to 41 μS/cm per °dH.

Further Aspects of the Invention

The present invention also relates to a water softening system comprising an automatically adjustable blending means for mixing a blended water flow $V_{blended}(t)$ from a first softened partial flow $V(t)_{part1soft}$ and a second untreated water partial flow $V(t)_{part2raw}$, and an electronic control means, wherein the control means is designed to readjust the adjustment position of the blending means by means of one or more experimentally determined instantaneous measured values in such a fashion that the water hardness in the blended water flow is adjusted to a predetermined desired value, characterized in that the control means comprises a storage with one or more stored defined operating situations, and the control means is furthermore designed to ignore at least one of the one or more instantaneous measured values for readjustment of the adjustment position of the blending means, when one of the defined operating situations has occurred, and instead use the respectively last corresponding measured value that was valid prior to occurrence of the defined operating situation or a standard value for the corresponding measured value, which is stored in the electronic control means. In the inventive water softening system, the wear of the blending means is reduced and the blended water hardness can be adjusted with more reliability. The control means typically also has intermediate storages for the last valid measured values and/or storages for standard values of measured values.

The present invention also concerns the use of an inventive water softening system in an inventive method as described above.

Further advantages can be extracted from the description and the drawing. The features mentioned above and below may be used individually or collectively in arbitrary combination. The embodiments shown and described are not to be taken as an exhaustive enumeration but have exemplary character for describing the invention.

BREIF DESCRIPTION OF THE DRAWING

The invention is illustrated in the drawing and explained in more detail with reference to embodiments.

DETAILED DESCRIPTION

Figure 1:
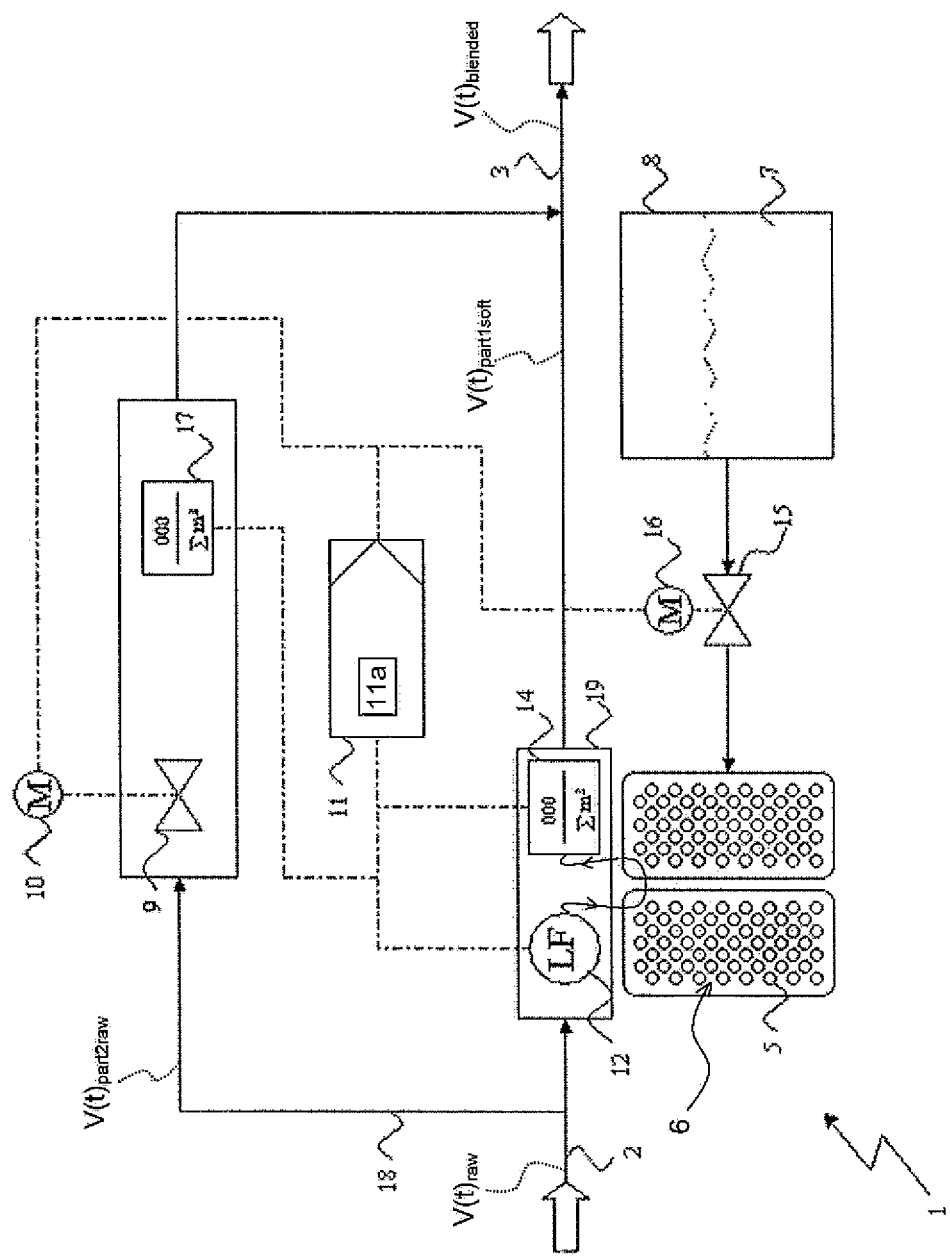
FIG. 1 shows a schematic view of an inventive water softening system with a conductivity sensor in the untreated water area for use in an inventive method.

FIG. 1 shows a schematic view of an inventive water softening system 1 for use in an inventive operating method.

The water softening system 1 is connected via an inlet 2 to a local water supply system, e.g. the drinking water network. A first part of the (overall) untreated water flow $V(t)_{raw}$ that flows at the inlet, flows to a softening device 6 which has, in particular, a control head 19 and two chambers with ion exchange resin 5. A second part of the untreated water flows into a bypass line 18.

The untreated water flowing into the softening device 6 initially passes a conductivity sensor 12 which determines the instantaneous water hardness $WH_{raw}^{inst}$ of or the untreated water. The untreated water then passes one of the two chambers with ion exchange resin 5, whereby it is completely softened. The softened water finally passes the flow meter 14 which determines the instantaneous first partial flow $V(t)_{part1soft}^{inst}$.

The second part of the untreated water in the bypass line 18 initially passes an automatically actuatable blending means, in the present case a blending valve 9 that can be adjusted by a servomotor 10, and subsequently passes a flow meter 17 that determines the instantaneous second partial flow $V(t)_{part2raw}^{inst}$.

The first partial flow $V(t)_{part1soft}$ and the second partial flow $V(t)_{part2raw}$ are finally combined into a blended water flow $V(t)_{blended}$ which flows to an outlet 3. The outlet 3 is connected to a downstream water installation, e.g. the fresh water lines of a building.

The measurement results of the conductivity sensor 12 and the flow meters 14, 17 are transferred to an electronic control means 11. A desired value SW of the water hardness (in the present case 8° dH) of the blended water is stored in the control means 11. The control means 11 determines an instantaneous desired ratio of the partial flows $V(t)_{part1soft}$ and $V(t)_{part2raw}$ from the desired value SW of the blended water hardness and the instantaneous water hardness $WH_{raw}^{inst}$, which yields the desired water hardness in the blended water. When the instantaneous partial flows $V(t)_{part1soft}^{inst}$ and $V(t)_{part2raw}^{inst}$ do not correspond to the desired ratio, the control means 11 automatically adjusts the adjustment position (in the present case the flow cross-section) of the blending valve 9 via the servomotor 10, e.g. via a PD or PID control. For this reason, the water softening system 1 can provide a constant blended water hardness even when the untreated water hardness fluctuates.

The control means 11 additionally also monitors the degree of depletion of the chamber of the softening device 6, which is active at that moment. When water is withdrawn, the withdrawn soft water amount is respectively weighted with the associated instantaneous untreated water hardness and subtracted form the (instantaneous residual) capacity. When the chamber has been depleted, the control means 11 switches the softening device 6 to the other (non-depleted) chamber and also initiates regeneration of the depleted chamber. Towards this end, a regeneration valve 15 is automatically actuated by a servomotor 16 through the control means 11, whereupon regenerant solution (preferably brine) 7 flows from a supply container 8 through the depleted chamber. During regeneration, part of the untreated water flowing to the control head 19 is at least temporarily branched off upstream of the flow meter 14 and used as a rinsing water flow. Since the flow meter 14 of the illustrated embodiment directly determines the soft water flow $V(t)_{part1soft}^{inst}$ flowing out of the control head 19, this branch-off does not impair automatic readjustment of the adjustment position of the blending means, and the rinsing flow does not need to be determined (note: when a partial flow is indirectly determined via the overall untreated water flow, the rinsing flow would have to be taken into consideration in accordance with $$V(t)_{raw} = V(t)_{part1soft} + V(t)_{part2raw} + V(t)_{part3rinse}.$$

During regeneration, an electrolysis current (the current for chlorination of the ion exchange resin 5 during regeneration for disinfection) is also controlled in the present case. The brine concentration can thereby be monitored at the same time. A lack of salt can then be detected in time.

Two different types of conversion from the measured electrical conductivity into the untreated water hardness are provided in the electronic control means 11 for determining the untreated water hardness from the electrical conductivity of the untreated water. Conversion with a first calibration curve (F1) is conservative and represents the maximum water hardnesses that occur (determined from previous measurements) for different conductivities. It is used for automatic control of regeneration of an ion exchange resin 5 with known capacity of the ion exchange resin 5. The conversion with a second calibration curve (F2) is realistic and represents the average water hardnesses (i.e. those with the smallest statistical error) for various conductivities. It is used for controlling the blending device (i.e. the ratio between the two partial flows in the blended water).

One particular feature of the invention consists in that the control means 11 has a storage 11a for defined operating situations, in which readjustment of the adjustment position of the blending means (in the present case the blending valve 9) is not effected on the basis of the instantaneous measured values $WH_{raw}^{inst}$, $V(t)_{part1soft}^{inst}$ and $V(t)_{part2raw}^{inst}$ but entirely or partially on the basis of the last values for these measured values which were valid prior to occurrence of the defined operating situation, or on stored (pre-defined) standard values for these measured values. It should be noted that the defined operating situations are tested and instantaneous measured values are ignored, if necessary, when blended water is just being withdrawn. In detail, the illustrated embodiment has three stored defined operating situations that are listed in table 1.

TABLE 1

| No | Occurrence of a defined operating situation | Intended substitute for measured values |
|---|---|---|
| 1 | $WH_{raw}^{inst} < 2°$ dH or $WH_{raw}^{inst} > 50°$ dH | For readjustment of the adjustment position of the blending means use the value $WH_{raw} = 14°$ dH For control of automatic regeneration triggering use the value $WH_{raw} = 20°$ dH |
| 2 | $WH_{raw}^{inst}$ has changed by less than 0.5°dH since the last readjustment of the adjustment position of the blending means | For readjustment of the blending means use the defined value $WH_{raw}$ at the time of the last readjustment |
| 3 | $V(t)_{part1soft}^{inst}$ or $V(t)_{part2raw}^{inst}$ are outside of the value range of 150 l/h to 1800 l/h | Readjustment of the adjustment position of the blending means is completely suspended |

The defined operating situation no. 1 indicates unreliable measured values for the untreated water hardness that are an indication of a sensor defect. As a measure, the control means 11 for regeneration triggering takes as a basis a conservative (set at a high value) pre-programmed untreated water hardness value of 20° dH in order to rule out a hardness breakthrough (due to capacity depletion of the ion exchange resin). As an alternative, a stored experimentally determined untreated water hardness value at the time of the last regeneration could e.g. be used (closer to reality but less reliable). A realistic pre-programmed untreated water hardness value of 14° dH is used for readjustment of the adjustment position of the blending means. Readjustment of the adjustment position of the blending means could alternatively also be simply completely suspended (i.e. the previous adjustment position is not changed).

The defined operating situation no. 2 indicates a slight fluctuation in the untreated water hardness which has only little effect on the blended water hardness and shall therefore not be taken into consideration in the readjustment of the adjustment position of the blending means. This reduces the wear of the blending means. The substitute value is thereby the last valid experimental measured value of the untreated water hardness that was taken into consideration in the last (most recent) readjustment. Only when the instantaneous untreated water hardness has changed by more than the predetermined value of 0.5° dH compared to the last valid measured value, readjustment is performed again.

The defined operating situation no. 3 indicates that the reliable measurement range of one (or also both) flow meter(s) 14, 17 has been left. In this case, readjustment is completely suspended, i.e. for $WH_{raw}$ and also for $V(t)_{part1soft}^{inst}$ and $V(t)_{part2raw}^{inst}$ the last values that were valid before the reliable measurement range has been left are used, whereby the electronic control means 11 will not control any change of the adjustment position of the blending means.

Note: If one of the partial flows were indirectly determined, e.g. the first partial flow $V(t)_{part1soft}^{inst}$ were determined through the correlation $V(t)_{part1soft}^{inst} = V(t)_{raw}^{inst} - V(t)_{part2raw}^{inst}$, setting up of a further fourth defined operating situation would be taken into consideration. The fourth defined operating situation would occur during regeneration of one of the ion exchange resin chambers or when $V(t)_{part3rinse}^{inst} > 0$. In this case, a rinsing water flow $V(t)_{part3rinse}$ flows, which would have to be taken into consideration in the indirect determination of the volume flows for readjustment of the blending means. If this is not possible (e.g. due to lack of a corresponding flow meter), readjustment of the adjustment position of the blending means may e.g. be completely suspended as an inventive measure in the fourth operating situation (i.e. in regeneration phases).

By establishing the defined operating situations, unnecessary or even disadvantageous adjustments of the blending means during the tapping of the blended water are prevented, thereby considerably improving the reliability of the water softening system 1.

Figure 2:
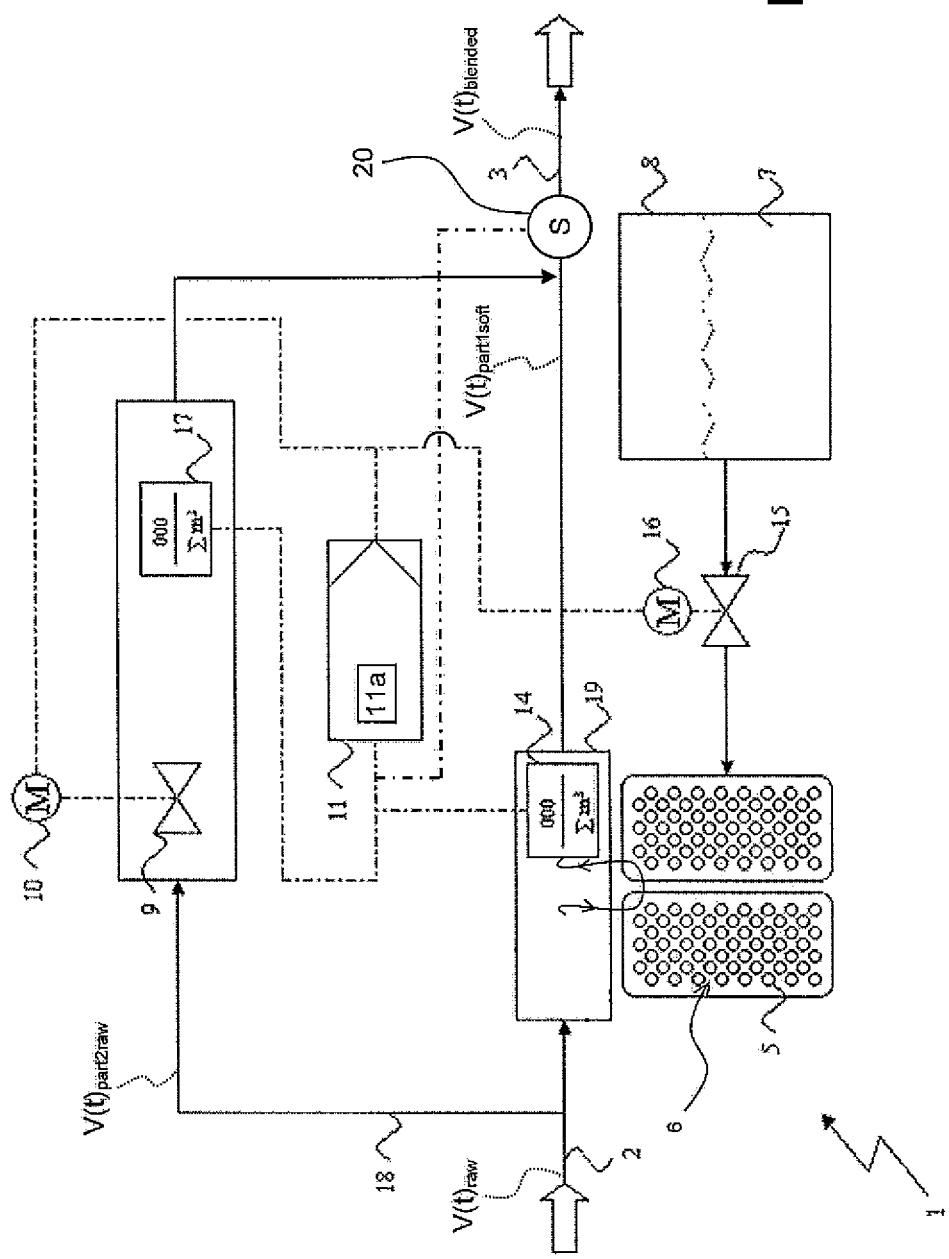
FIG. 2 shows a schematic view of an inventive water softening system with a hardness sensor in the blended water area for use in an inventive method.

FIG. 2 shows a water softening system which is similar to FIG. 1 and can also be used together with the inventive methods. Only the differences are explained below.

In this embodiment of the water softening system 1, a sensor 20 is not disposed in the untreated water area but in the blended water area just upstream of the outlet 3. In this case, the water hardness $WH_{blended}^{inst}$ in the blended water flow $V(t)_{blended}$ can be directly determined and compared with the desired value SW. The control means 11 can directly readjust the adjustment position of the blending means (in the present case the blending valve 9) by means of the instantaneous water hardness $WH_{blended}^{inst}$. In particular, the instantaneous partial flows $V(t)_{part1soft}^{inst}$ and $V(t)_{part2raw}^{inst}$ are not used for readjustment of the adjustment position of the blending means of this embodiment.

For this reason, the operating situations of this embodiment have slightly different definitions:

TABLE 2

| No | Occurrence of a defined operating situation | Intended substitute for measured values |
|---|---|---|
| 1 | $WH_{blended}^{inst} < 2°$ dH or $WH_{blended}^{inst} > 50°$ dH | Readjustment of the adjustment position of the blending means is completely suspended, use the value $WH_{blended} = 8°$ dH for control of automatic regeneration triggering |
| 2 | $WH_{blended}^{inst}$ has changed by less than 0.5° dH after the last readjustment of the adjustment position of the blending means | Readjustment of the adjustment position of the blending means is completely suspended |

In as far as readjustment of the adjustment position of the blending means is concerned, the readjustment is suspended in each defined operating situation no. 1 and 2 or continued with the last value for the blended water hardness that was present prior to occurrence of the defined operating situation such that a change of the adjustment position of the blending means is not controlled.

For regeneration control, in the defined operating situation no. 1, which indicates a defect of the sensor 20, it is assumed that an average water hardness (in the present case the desired value of 8° dH) in the blended water is still set. It should be noted that the partial flows $V(t)_{part1soft}^{inst}$ and $V(t)_{part2raw}^{inst}$ should be known for automatic triggering of regeneration control (due to the weighting performed in the embodiment of the different soft water withdrawals within one operating cycle with the associated instantaneous untreated water hardnesses) in order to be able to back-calculate the untreated water hardness on the basis of the blended water hardness.

The invention claimed is:

1. A method for operating a water softening blending system comprising:
    mixing a blended water flow $V(t)_{blended}$ from a first, softened partial flow $V(t)_{part1soft}$ and a second untreated water partial flow $V(t)_{part2raw}$ with an automatically adjustable blender; and
    readjusting an adjustment position of the blender with an electronic controller using one or more experimentally determined instantaneous measured values in such a fashion that a water hardness in the blended water flow $V(t)_{blended}$ is adjusted to a predetermined desired value (SW), and
    wherein the electronic controller ignores at least one of the one or more instantaneous measured values for readjustment of the adjustment position of the blender in one or more defined operating situations of the water softening blending system, and instead uses a respectively last corresponding measured value that was valid prior to occurrence of the defined operating situation, or a standard value for a corresponding measured value, which is stored in the electronic controller,
    wherein the method comprises a sensor in an untreated water area of the water softening blending system for determining an instantaneous untreated water hardness $WH_{raw}^{inst}$ and at least two flow meters for direct or indirect determination of instantaneous partial flows $V(t)_{part1soft}^{inst}$ and $V(t)_{part2raw}^{inst}$ and the electronic controller ignores at least one of the instantaneous measured values $WH_{raw}^{inst}$, $V(t)_{part1soft}^{inst}$ and $V(t)_{part2raw}^{inst}$ for readjustment of the adjustment position of the blending device in the defined operating situations, and instead uses a respectively last corresponding measured value that was valid prior to occurrence of the defined operating situation or a standard value for a corresponding measured value, which is stored in the electronic controller.

2. The method according to claim 1, wherein the sensor is designed as a conductivity sensor, which determines an instantaneous electrical conductivity $L_{raw}^{inst}$ of the untreated water, that the electronic controller determines the instantaneous untreated water hardness $WH_{raw}^{inst}$ from the determined instantaneous conductivity $L_{raw}^{inst}$ of the untreated water, and wherein the electronic controller furthermore determines an instantaneous desired ratio of the partial flows $V(t)_{part1soft}$ and $V(t)_{part2raw}$ from the determined instantaneous untreated water hardness $WH_{raw}^{inst}$ by means of which the predetermined desired value (SW) of the water hardness is established in the blended water flow $V(t)_{blended}$, and wherein the electronic controller readjusts the adjustment position of the blender to the instantaneous desired ratio according to the determined instantaneous partial flows $V(t)_{part1soft}^{inst}$ and $V(t)_{part2raw}^{inst}$.

3. The method according to claim 1 wherein the electronic controller ignores the measured values for the two instantaneous partial flows $V(t)_{part1soft}^{inst}$ and $V(t)_{part2raw}^{inst}$ only in combination together.

4. The method according to claim 1 wherein the defined operating situations include times when the ratio between the measured values $V(t)_{part1soft}^{inst}$ and $V(t)_{part2raw}^{inst}$ has changed since the last readjustment of the adjustment position of the blending means by less than a relative flow change value, and wherein the relative flow change value is between 2% and 10%.

5. The method according to claim 1 wherein the defined operating situations include the times of regeneration of a softening device.

6. The method according to claim 1 wherein the defined operating situations include falling below a minimum flow rate and/or exceeding a maximum flow rate at a flow meter.

7. The method according to claim 1 wherein the defined operating situations include times when there is a hardness breakthrough at a water softening system supplying the softened partial flow $V(t)_{part1soft}$.

8. The method according to claim 1 wherein the defined operating situations include times when a leakage is detected at a water softening system supplying the softened partial flow $V(t)_{part1soft}$, the water softening blending system or any downstream water installation.

9. The method according to claim 1 wherein in at least part of the defined operating situations, the electronic controller completely suspends readjustment of the adjustment position of the blender such that the blended water flow is mixed with the last adjustment position of the blender, which was set prior to occurrence of the defined operating situation.

10. The method according to claim 1 wherein the water softening blending system comprises a conductivity sensor in an untreated water area for determining the instantaneous conductivity of the untreated water $L_{raw}^{inst}$, and that the defined operating situations include times when the instantaneous measured value $L_{raw}^{inst}$ has changed by less than a predefined conductivity difference value since the last readjustment of the adjustment position of the blending means, wherein the conductivity difference value is between 5μS/cm and 50μS/cm.

11. The method according to claim 1 wherein the defined operating situations include times when at least a minimum amount of water has not been continuously flowing through the water softening blending system directly prior to an intended evaluation of one or more of the instantaneous measured values.

12. The method according to claim 1 wherein the defined operating situations include times when water has not been continuously flowing through the water softening blending system for at least a minimum duration directly prior to an intended evaluation of one or more of the instantaneous measured values.

13. The method according to claim 1 wherein the water softening blending system further comprises a supply container for providing regenerant solution and apparatus for automatic performance of regeneration of a softening device, and the electronic controller automatically triggers regeneration of the softening device in dependence on soft water withdrawals performed since a the last regeneration of the softening device.

14. The method according to claim 13, wherein the electronic controller detects a residual capacity of the softening device in dependence on the soft water withdrawals performed since a last triggered regeneration, and on one or more associated determined untreated water hardnesses, and upon depletion thereof, automatically triggers regeneration of the softening device .

15. The method according to claim 14 wherein the water softening blending system comprises a conductivity sensor in the untreated water area, and that an overall hardness I of the untreated water, which hardness is used to control the regeneration process of the softening device is derived from the measured conductivity $L_{raw}$ by means of a first calibration characteristic (F1), and an overall hardness II of the untreated water, which hardness is used to control the blending means, is derived from the measured conductivity $L_{raw}$ using a second calibration characteristic (F2).

16. The method according to claim 15, wherein the overall hardness I derived from the first calibration characteristic (F1) is greater, at least in sections, than the overall hardness II derived from the second calibration characteristic (F2).

17. The method according to claim 13 wherein the electronic controller ignores at least one of the one or more instantaneous measured values also for automatic triggering of regeneration of a softening system in one or more defined operating situations, and instead uses a respectively last corresponding measured value that was valid prior to occurrence of the operating situation, or a standard value for a corresponding measured value, which is stored in the electronic controller.

18. A method for operating a water softening blending system comprising:
mixing a blended water flow $V(t)_{blended}$ from a first, softened partial flow $V(t)_{part1soft}$ and a second untreated water partial flow $V(t)_{part2raw}$ with an automatically adjustable blender; and
readjusting an adjustment position of the blender with an electronic controller using one or more experimentally determined instantaneous measured values in such a fashion that a water hardness in the blended water flow $V(t)_{blended}$ is adjusted to a predetermined desired value (SW), and
wherein the electronic controller ignores at least one of the one or more instantaneous measured values for readjustment of the adjustment position of the blender in one or more defined operating situations of the water softening blending system, and instead uses a respectively last corresponding measured value that was valid prior to occurrence of the defined operating situation, or a standard value for a corresponding measured value, which is stored in the electronic controller,
wherein the defined operating situations include times when an experimentally determined instantaneous water hardness, an instantaneous untreated water hardness $WH_{raw}^{inst}$ or an instantaneous blended water hardness $WH_{blended}^{inst}$ is outside of a predetermined value interval.

19. The method according to claim 18 wherein the defined operating situations include times when the experimentally determined instantaneous water hardness, the instantaneous untreated water hardness $WH_{raw}^{inst}$ or the instantaneous blended water hardness $WH_{blended}^{inst}$ has changed by less than a predefined hardness difference value since the last readjustment of the adjustment position of the blending means, in particular, wherein the hardness difference value is between 0.2° dH and 2.0° dH.

20. The method according to claim 18, wherein the predetermined value interval ranges from 2° dH to 50° dH.

21. The method according to claim 18, wherein the water softening blending system comprises a sensor in a blended water area of the water softening blending system for determining the instantaneous blended water hardness $WH_{blended}^{inst}$, and that the electronic controller ignores at least the instantaneous measured value $WH_{blended}^{inst}$ for readjustment of the adjustment position of the blender in the defined operating situations, and instead uses the last defined blended water hardness that was valid prior to occurrence of the defined operating situation or a standard value for the blended water hardness, which is stored in the electronic controller.

* * * * *